United States Patent
Yoon et al.

(10) Patent No.: US 11,091,671 B2
(45) Date of Patent: Aug. 17, 2021

(54) HIGH-REFRACTIVE ADHESIVE FILM AND TOUCH PANEL INCLUDING THE SAME

(71) Applicant: LG Chem, Ltd., Seoul (KR)

(72) Inventors: Chan-Oh Yoon, Cheongju-si (KR); Sung-Chan Park, Seoul (KR); Jang-Soon Kim, Seongnam-si (KR); Eun-Kyung Park, Seoul (KR); Bu-Gi Jung, Anyang-si (KR); Won-Ho Kim, Seoul (KR)

(73) Assignee: LG Chem, Ltd.

( * ) Notice: Subject to any disclaimer, the term of this patent is extended or adjusted under 35 U.S.C. 154(b) by 199 days.

(21) Appl. No.: 14/917,269

(22) PCT Filed: Oct. 20, 2014

(86) PCT No.: PCT/KR2014/009840
§ 371 (c)(1),
(2) Date: Mar. 7, 2016

(87) PCT Pub. No.: WO2015/060599
PCT Pub. Date: Apr. 30, 2015

(65) Prior Publication Data
US 2016/0215175 A1    Jul. 28, 2016

(30) Foreign Application Priority Data
Oct. 23, 2013    (KR) .................. 10-2013-0126713

(51) Int. Cl.
*C09J 7/22*    (2018.01)
*G06F 3/041*    (2006.01)
(Continued)

(52) U.S. Cl.
CPC .. *C09J 7/22* (2018.01); *C09J 7/10* (2018.01); *C09J 11/04* (2013.01); *C09J 133/066* (2013.01);
(Continued)

(58) Field of Classification Search
CPC ..... C09J 7/00; C09J 7/02; C09J 7/0207; C09J 7/021; C09J 7/0217; C09J 7/026;
(Continued)

(56) References Cited

U.S. PATENT DOCUMENTS 3,432,225 A * 3/1969 Rock .................. C03C 17/3417
359/588
5,450,238 A * 9/1995 Bjornard ................. G02B 1/116
359/580
(Continued)

FOREIGN PATENT DOCUMENTS

JP    H11080688 A    3/1999
JP    2002212526 A    7/2002
(Continued)

OTHER PUBLICATIONS

Machine Translation of KR-2013-0126097A (Year: 2013).*
(Continued)

*Primary Examiner* — Scott R. Walshon
(74) *Attorney, Agent, or Firm* — Lerner, David, Littenberg, Krumholz & Mentlik, LLP

(57) ABSTRACT

A high-refractive adhesive film includes: a thermosetting resin matrix; and high refractive particles dispersed in the thermosetting resin matrix. The refraction index of the high-refractive particles is higher than that of the thermosetting resin matrix.

10 Claims, 3 Drawing Sheets

(51) Int. Cl.
*C08K 3/22* (2006.01)
*G06F 3/044* (2006.01)
*C09J 133/06* (2006.01)
*C09J 7/10* (2018.01)
*C09J 11/04* (2006.01)
*C09J 133/08* (2006.01)

(52) U.S. Cl.
CPC ............ G06F 3/041 (2013.01); G06F 3/0412 (2013.01); *C08K 3/22* (2013.01); *C08K 2003/2244* (2013.01); *C08K 2201/002* (2013.01); *C09J 133/08* (2013.01); *C09J 2203/318* (2013.01); *C09J 2301/30* (2020.08); *C09J 2301/312* (2020.08); *C09J 2301/314* (2020.08); *C09J 2301/408* (2020.08); *C09J 2433/00* (2013.01); *C09J 2467/005* (2013.01); *G06F 3/044* (2013.01); *G06F 2203/04103* (2013.01)

(58) Field of Classification Search
CPC ... C09J 11/00; C09J 11/02; C09J 11/04; C09J 11/06; C09J 11/08; C09J 2201/622; C09J 2201/602; C09J 2201/606; G06F 3/0412; G06F 3/041; G06F 3/044
See application file for complete search history.

(56) References Cited

U.S. PATENT DOCUMENTS

| | | | | |
|---|---|---|---|---|
| 6,288,172 | B1 * | 9/2001 | Goetz | C09J 7/0207 525/200 |
| 6,503,620 | B1 * | 1/2003 | Xie | B32B 7/06 428/354 |
| 9,305,680 | B2 * | 4/2016 | Yamazaki | H01B 5/14 |
| 2008/0026182 | A1 * | 1/2008 | Abe | C08F 290/06 428/141 |
| 2009/0081430 | A1 * | 3/2009 | Husemann | B32B 17/10009 428/212 |
| 2009/0084130 | A1 * | 4/2009 | Zhang | F25B 43/006 62/503 |
| 2009/0279168 | A1 * | 11/2009 | Hiwatashi | C09J 11/06 359/359 |
| 2010/0068421 | A1 * | 3/2010 | Tse | C09J 4/00 428/1.54 |
| 2010/0210772 | A1 * | 8/2010 | Hiwatashi | C09J 133/08 524/407 |
| 2011/0074730 | A1 | 3/2011 | Nagata et al. | |
| 2011/0242796 | A1 * | 10/2011 | Yang | C09J 11/02 362/97.1 |
| 2012/0094071 | A1 * | 4/2012 | Itoh | G06F 3/044 428/141 |
| 2012/0107605 | A1 * | 5/2012 | Ozawa | C08J 7/045 428/329 |
| 2012/0231245 | A1 * | 9/2012 | Kim | C09J 4/00 428/212 |
| 2012/0263947 | A1 * | 10/2012 | Ozawa | C09D 183/04 428/354 |
| 2013/0063393 | A1 * | 3/2013 | Kurishima | B32B 7/12 345/174 |
| 2013/0141879 | A1 | 6/2013 | Tanaka et al. | |
| 2013/0154473 | A1 | 6/2013 | Kaneko et al. | |
| 2013/0194221 | A1 * | 8/2013 | Takada | B32B 7/02 345/173 |
| 2013/0224436 | A1 * | 8/2013 | Kim | C09J 4/00 428/141 |
| 2014/0213725 | A1 | 7/2014 | Yamazaki et al. | |
| 2014/0329101 | A1 * | 11/2014 | Kawasaki | B32B 27/36 428/480 |
| 2016/0072101 | A1 | 3/2016 | Choi et al. | |

FOREIGN PATENT DOCUMENTS

| | | |
|---|---|---|
| JP | 2003315787 A | 11/2003 |
| JP | 2008208378 A | 9/2008 |
| JP | 200924253 A | 2/2009 |
| JP | 2009102581 A | 5/2009 |
| JP | 2009120726 A | 6/2009 |
| JP | 20110096234 A | 5/2011 |
| JP | 2012052010 A | 3/2012 |
| JP | 201281663 A | 4/2012 |
| JP | 2012146211 A | 8/2012 |
| JP | 2012246455 A | 12/2012 |
| JP | 2013510402 A | 3/2013 |
| JP | 20130054516 A | 3/2013 |
| JP | 2013512326 A | 4/2013 |
| JP | 2013116992 A | 6/2013 |
| JP | 2013155357 A | 8/2013 |
| JP | 2016528702 A | 9/2016 |
| KR | 20110068833 A | 6/2011 |
| KR | 20110104249 A | 9/2011 |
| KR | 20120046240 A | 5/2012 |
| KR | 20130031910 A | 3/2013 |
| KR | 20130126097 A * | 11/2013 ............ G06F 3/041 |
| TW | 201139592 A | 11/2011 |
| WO | WO-2011108438 A1 * | 9/2011 ............ B32B 27/08 |
| WO | WO-2012064071 A2 * | 5/2012 ............... C09J 4/00 |
| WO | WO-2012090735 A1 * | 7/2012 ......... C23C 14/5806 |
| WO | 2013047786 A1 | 4/2013 |
| WO | 2013114945 A1 | 8/2013 |

OTHER PUBLICATIONS

Machine Translation of JP 2009-120726 A (Year: 2009).*
International Search Report dated Jan. 28, 2015 corresponding to International Application No. PCT/KR2014/009840, citing the above reference(s).

* cited by examiner

HIGH-REFRACTIVE ADHESIVE FILM AND TOUCH PANEL INCLUDING THE SAME

CROSS REFERENCE TO RELATED APPLICATION

This application claims the priority of Korean Patent Application No. 10-2013-0126713, filed on Oct. 23, 2013 in the KIPO (Korean Intellectual Property Office). Further, this application is the National Phase application of International Application No. PCT/KR2014/009840 filed Oct. 20, 2014, which designates the United States and was published in Korean.

TECHNICAL FIELD

The present disclosure relates to a high-refractive adhesive film and a touch panel including the same.

BACKGROUND ART

Huge markets for electronic devices such as PDAs, mobile terminals and automotive navigation devices have recently been established. A touch screen or a touch panel switch is installed as input means of such electronic devices. In order to make the electronic devices lighter and prevent the input means from being broken, a transparent conductive plastic film is being employed. An example of such transparent conductive plastic films is a transparent conductive film that includes a polyethylene terephthalate (PET) as a base substrate and a conductive layer formed thereon such as indium tin oxide (ITO). The transparent conductive film is attached to a conductive glass, a reinforcing material or a decorative film via an adhesive layer.

DISCLOSURE

Technical Problem

It is an aspect of the present disclosure to provide a high-refractive adhesive film with improved visibility and transmittance.

It is another aspect of the present disclosure to provide a touch panel including the high-refractive adhesive film.

Technical Solution

In accordance with one aspect of the present disclosure, a high-refractive adhesive film includes: a thermosetting resin matrix; and high refractive particles dispersed in the thermosetting resin matrix. The refraction index of the high-refractive particles is higher than that of the thermosetting resin matrix.

The refraction index of the high-refractive particles may range from approximately 1.55 to 2.42.

0.1 to 10 parts by weight of the high refractive particles per 100 parts by weight of the thermosetting resin matrix may be included.

The average diameter of the high refractive particles may range from approximately 0.01 μm to 10 μm The refractive particles 2 may include one selected from the group consisting of zirconium oxide ($ZrO_2$), titanium oxide ($TiO_2$), 3-vinylaniline, barium titanate, fluorine epoxy modified acrylate, niobium oxide, cerium oxide, zinc sulfide and a combination thereof.

The thickness of the high-refractive adhesive film may range from approximately 25 μm to 250 μm.

The thermosetting resin matrix may be formed by curing an epoxy acrylate photo-curable resin composition or an acrylic photo-curable resin composition that includes one selected from the group consisting of: 2-ethylhexyl acylate (2-EHA), isobornyl acrylate (IBOA), hydroxy ethyl acrylate (HEA), hydroxy butyl acrylate (HBA), hydroxy propyl acrylate (HPA), hexyl methacrylate (HMA) and a combination thereof.

A functional group that is selected from the group consisting of: a hydroxy group, a carbonyl group, an aldehyde group, a halo formyl group, a carbonate ester group, a carboxylate group, a carboxyl group, an ester group, a hydroperoxide group, peroxide group, an ether group, a hemiketal group, an acetal groups, an ortho ester groups, an ortho carbonate ester group, a carboxylic acid group, an amide group, an amine group, an imine group, an azide group, an azo compound group, a cyanate group, a nitrate group, a nitrile group, a nitro compound group, a nitroso compound group, a thiol group, a sulfonic acid group and a combination thereof may exist on a surface of the high-refractive adhesive film.

The refractive index of the high-refractive adhesive film may range from approximately 1.49 to 1.56.

A release film may be stacked on one or both surfaces of the high-refractive adhesive film.

The release film may include one selected from the group consisting of polyethylene terephthalate, silicone layer with the release silicone applied thereon and a combination thereof.

In accordance with another aspect of the present disclosure, a touch panel includes a conductive plastic film with a conductive layer formed thereon; and the high-refractive adhesive film attached on the conductive layer.

The conductive plastic film may be a polyethylene terephthalate (PET) film having an ITO or conductive metal oxide layer formed thereon.

Advantageous Effects

According to an exemplary embodiment of the present disclosure, a high-refractive adhesive film has improved visibility and transmittance.

BEST MODE

Figure 1:
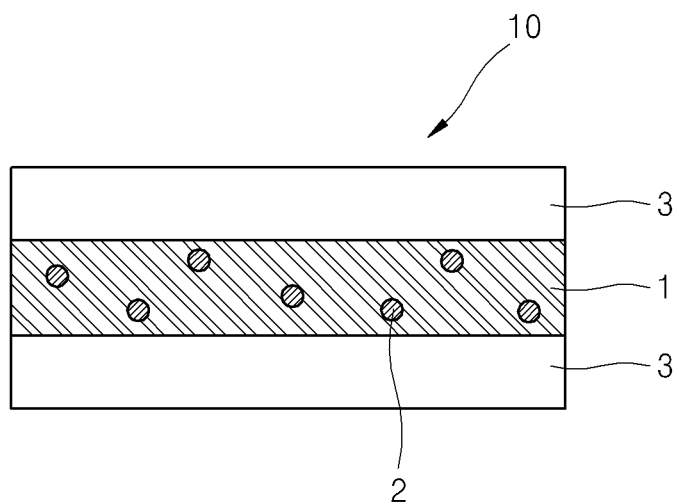
FIG. 1 is a cross-sectional view of a high-refractive adhesive film according to an exemplary embodiment of the present disclosure.

In the following detailed description, reference is made to the accompanying drawings that show, by way of illustration, specific embodiments in which the claimed subject matter may be practiced. These embodiments are described in sufficient detail to enable those skilled in the art to practice the subject matter. The present disclosure may, however, be embodied in many different forms and should not be construed as limited to the embodiments set forth herein.

Well-known elements have been omitted in order not to unnecessarily obscure the gist of the present disclosure. Like reference numerals designate like elements throughout the specification.

In the drawings, the thickness of layers, regions, etc., are enlarged for the sake of clarity. In addition, in the drawings, the thickness of some layers, regions, etc., are shown as being exaggerated for convenience of illustration.

It will be understood that when an element such as a layer, region, substrate, or panel is referred to as being "on" or "under" another element, it can be directly on or under the other element or intervening elements may also be present.

FIG. 1 is a cross-sectional view of a high-refractive adhesive film 10 including a thermosetting resin matrix 1 and a high refractive particles 2 dispersed in the thermosetting resin matrix 1 according to an exemplary embodiment of the present disclosure. The high-refractive adhesive film 10 has an improved refractive index as the high refractive particles 2 having a high refractive index are dispersed in the thermosetting resin matrix 1 of the adhesive layer.

In an exemplary embodiment, the high-refractive adhesive film 10 may have a refractive index ranging from approximately 1.49 to 1.56.

The high refractive particles 2 have a refractive index higher than that of the thermosetting resin matrix 1. Specifically, the refractive index of the high refractive particles 2 may range from approximately 1.55 to 2.42, more preferably, 1.75 to 2.18.

The high-refractive adhesive film 10 may be used as an adhesive film for attaching a transparent conductive film on a display device such as a mobile device, a tablet PC, etc. Specifically, the transparent conductive film may be made of a transparent plastic film with a conductive layer. Typically, the refractive indices of the transparent plastic film and the conductive layer are higher than the refractive index of the adhesive layer. Accordingly, the adhesive layer having a lower refractive index may cause light transmittance to be lowered. In view of this, the high-refractive adhesive film 10 has an improved refractive index, and can avoid decrease in light transmittance when applied as an adhesive film for attaching a transparent conductive film having a higher refractive index.

In an exemplary embodiment, the high-refractive adhesive film 10 may be attached on a window glass layer, a hard coated polyethylene terephthalate (PET) film, or indium tin oxide conductive layer, for example.

When the high-refractive adhesive film 10 is applied in a screen or a panel of a display device, the composition of adhesive for the thermosetting resin matrix 1 of the high-refractive adhesive film 10 may use any of compositions known in the art, so that the high-refractive adhesive film 10 is formed as an optically clear adhesive layer (OCA).

Specifically, the composition of the adhesive layer for the thermosetting resin matrix 1 of the high-refractive adhesive film 10 may be a photo-curable acrylate resin composition including 2-ethylhexyl acylate (2-EHA), isobornyl acrylate (IBOA), hydroxy ethyl acrylate (HEA), hydroxy butyl acrylate (HBA), hydroxy propyl acrylate (HPA), hexyl methacrylate (HMA), etc. A photoinitiator, a curing agent, and other additives may be added to the composition. For example, an epoxy-acrylate composition, which is not particularly limited, may be used other than the photo-curable acrylate resin compositions.

The thermosetting resin matrix 1 may be formed by irradiating the composition of adhesive with light, e.g., UV light to photo-cure or thermal-cure it.

Since the high-refractive adhesive film 10 is formed as an adhesive layer, a functional group that is selected from the group consisting of: a hydroxy group, a carbonyl group, an aldehyde group, a halo formyl group, a carbonate ester group, a carboxylate group, a carboxyl group, an ester group, a hydroperoxide group, peroxide group, an ether group, a hemiketal group, an acetal groups, an ortho ester groups, an ortho carbonate ester group, a carboxylic acid group, an amide group, an amine group, an imine group, an azide group, an azo compound group, a cyanate group, a nitrate group, a nitrile group, a nitro compound group, a nitroso compound group, a thiol group, a sulfonic acid group and a combination thereof may exist on the surface of the high-refractive adhesive film 10. That is, the high-refractive adhesive film 10 has a functional group with adhesive force.

As such, as the high-refractive adhesive film 10 has the adhesive surface, it can be attached to a target substance (not shown).

The high-refractive adhesive film 10 may include the high refractive particles 2 approximately from 0.1 to 10 parts by weight per 100 parts by weight of the thermosetting resin matrix. With the high refractive particles 2 in the above range, the high-refractive adhesive film 10 can improve the refractive index while maintaining light transmittance appropriately. If the high-refractive adhesive film 10 includes more than approximately 10 parts by weight of the refractive particles 2, its refractive index may become higher than the refractive indices of a transparent plastic film and a conductive layer of a touch panel, so that the light transmittance may even be lowered. In addition, the light transmittance of the high-refractive adhesive film 10 may also be lowered.

The high-refractive adhesive film 10 may be produced by dispersing the refractive particles 2 in the composition of adhesive by using any of known methods such as rolling milling or a bead milling, and then curing it.

The diameter of the refractive particles 2 may be determined so that they do not lower the light transmittance. For example, the average of the diameters of the refractive particles 2 may range from approximately 0.01 μm to 10 μm, more preferably 0.5 μm to 10 μm.

With the average of the diameters of the refractive particles 2 within the above range, the high-refractive adhesive film 10 can improve the refractive index while achieving good light transmittance.

Specifically, the refractive particles 2 may include one selected from the group consisting of zirconium oxide ($ZrO_2$), titanium oxide ($TiO_2$), 3-vinylaniline, barium titanate, fluorine epoxy modified acrylate, niobium oxide, cerium oxide, zinc sulfide and a combination thereof.

The thickness of the high-refractive adhesive film 10 is not particularly limited but may be selected as appropriately. For example, the thickness may range from approximately 25 μm to 250 μm. With the thickness within the above range, the high-refractive adhesive film 10 may have a desirable processibility as well as dispersibility of the high refractive particles. In addition, the film can be cured evenly and a desired physical property can be achieved.

A release film layer 2 may be stacked on one or both surfaces of the high-refractive adhesive film 10. When the high-refractive adhesive film 10 is applied onto a target substance (not shown), the release film layer 3 may be peeled off from the high-refractive adhesive film 10 and then the high-refractive adhesive film 10 may be attached on the target substance.

For example, the release film layer 3 may be formed by performing surface treatment on a surface of a target plastic film. Examples a release agent used in the surface treatment may include an alkyd-based agent, a silicone-based agent, a fluorine-based agent, unsaturated ester-based agent, a polyolefin-based agent, a wax-based agent, etc. Among these, an alkyd-based agent, a silicone-based agent and a fluorine-based agent are desirable in terms of heat resistance, but this is not limiting.

The thickness of the release film 3 is not particularly limited but may be selected as appropriately. For example, the thickness may range from approximately 10 μm to 125 μm, preferably 30 μm to 90 μm, more preferably 40 μm to 80 μm.

In another embodiment of the present disclosure, there is provided a touch panel which includes a conductive plastic film with a conductive layer formed thereon; and the high-refractive adhesive film attached on the conductive layer.

The touch panel may be a capacitive touch panel, for example. The specific structure of the touch panel and the method for fabricating the same are not particularly limited. The touch panel may be fabricated using any of known methods as long as the composition of adhesive may be applied.

Figure 2:
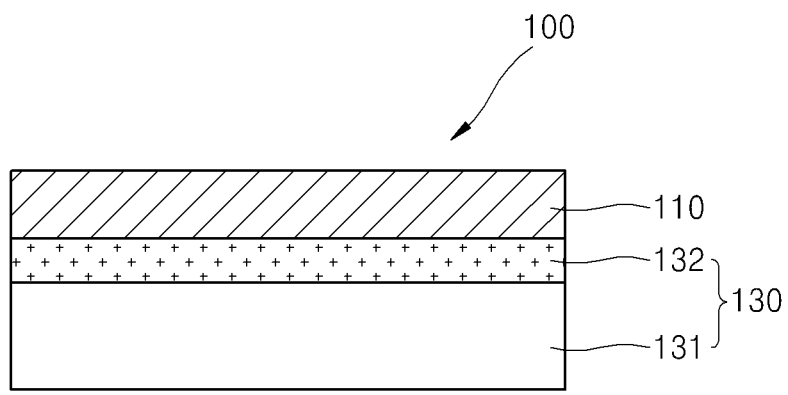
FIG. 2 is a view schematically showing a method for fabricating a laminate according to another exemplary embodiment of the present disclosure.

FIG. 2 is a cross-sectional view of a touch panel 100 according to another exemplary embodiment of the present disclosure.

In FIG. 2, the touch panel 100 may include a conductive plastic film 130 that includes a plastic base layer 131 and a conductive layer 132 formed on a surface of the plastic base layer 131, and the high-refractive adhesive film 110 formed on a surface of the conductive layer 132 of the conductive plastic film 130.

The type of the conductive plastic film 130 is not particularly limited, and any of conductive films known in the art may be employed. For example, the conductive plastic film 130 may be a transparent plastic film having an ITO electrode layer formed on its surface. Specifically, the transparent plastic film used for forming the plastic base layer 131 may be, but is not limited to, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, ethylene-methyl acrylate copolymer film or a polyimide film. More specifically, the plastic base layer 131 may be a polyethylene terephthalate (PET) film.

Figure 3:
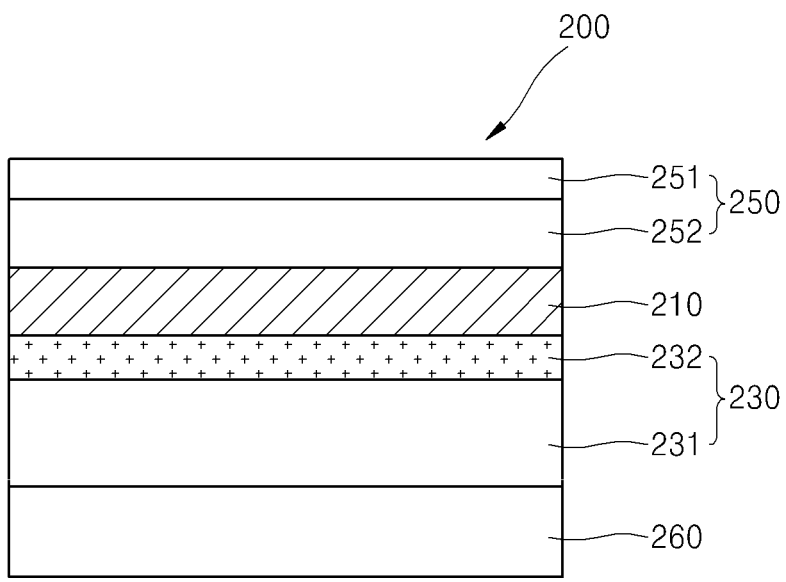
FIG. 3 is a cross-sectional view of a touch panel according to another exemplary embodiment of the present disclosure.
Figure 3:
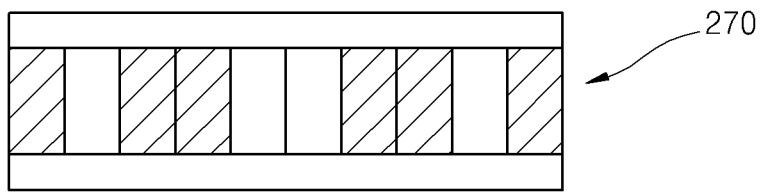

Referring to FIG. 3, the touch panel 200 may include a window cover 250 that includes an anti-reflection coating 251 and a protective film 252; a high-refractive adhesive film 210; a conductive plastic film 230 that includes a plastic base layer 231 and a conductive layer 232 thereon; and a transparent substrate 260. The touch panel 200 including the above layers may be attached to a display device such as a liquid-crystal display (LCD) device 270.

Hereinafter, comparison between Examples of the present disclosure and Comparative Example will be made. The embodiments to be described below are merely illustrative but are not limiting.

EXAMPLES

Example 1

100 parts by weight of 2-ethylhexyl acrylate (2-EHA), 60 parts by weight of isobornyl acrylate (IBOA), and 40 parts by weight of hydroxyethyl acrylate (HEA) were mixed. Then, a composition of adhesive were produced which includes 1-hydroxycyclohexyl phenyl ketone (Irgacure 184, HCPK) as a photoinitiator and a coupling agent as an additive. One part by weight of zirconium oxide was mixed with one hundred parts by weight of total monomers in the composition of adhesive. A polyethylene terephthalate (PET) film having the thickness of 75 μm underwent surface treatment, and then the composition of adhesive was coated thereon using a bar coater, such that the thickness of the adhesive film becomes 100 μm. Subsequently, ultraviolet ray was irradiated using a UV lamp for ten minutes, to produce a high-refractive adhesive film. Aldrich 230693 with the refractive index of 2.1, available from Sigma-Aldrich, was used as zirconium oxide having a particle diameter of 5 μm or less.

Example 2

A high-refractive adhesive film was produced in the same way as Example 1 except for that two parts by weight of zirconium oxide was mixed with one hundred parts by weight of total monomers in the composition of adhesive.

Example 3

A high-refractive adhesive film was produced in the same way as Example 1 except for that three parts by weight of zirconium oxide was mixed with one hundred parts by weight of total monomers in the composition of adhesive.

Example 4

A high-refractive adhesive film was produced in the same way as Example 1 except for that four parts by weight of zirconium oxide was mixed with one hundred parts by weight of total monomers in the composition of adhesive.

Example 5

A high-refractive adhesive film was produced in the same way as Example 1 except for that five parts by weight of zirconium oxide was mixed with one hundred parts by weight of total monomers in the composition of adhesive.

Comparative Example 1

An adhesive film was produced in the same way as Example 1 except for that the one part by weight of zirconium oxide was not mixed in the coating solution.

EVALUATION

Results of measuring the refractive indices of the high-refractive adhesive films in Examples 1 to 5 and the refractive index of the adhesive film of Comparative Example 1 by using an Abbe refractometer are shown in Table 1 below:

TABLE 1

| Adhesive Film | Refractive Index |
| --- | --- |
| Example 1 | 1.495 |
| Example 2 | 1.500 |
| Example 3 | 1.505 |
| Example 4 | 1.510 |
| Example 5 | 1.520 |
| Comparative Example 1 | 1.475 |

DESCRIPTION OF REFERENCE NUMERALS

1: thermosetting resin matrix
2: high refractive particles
3: release film
10, 110, 210: high-refractive film layer
100, 200: touch panel
130, 230: conductive plastic film
131, 231: plastic base layer
132, 232: conductive layer
250: window glass
251: anti-reflective coating
252: protective film
260: transparent substrate
270: liquid-crystal display (LCD) device

The invention claimed is:

1. A touch panel, comprising:
a conductive plastic film including a plastic base layer and a conductive layer having a first and a second surface, such that the second surface of the conductive layer is directly on a surface of the plastic base layer, wherein the conductive layer is indium tin oxide; and
a high-refractive adhesive film, the high-refractive adhesive film is attached on the first surface of the conductive layer, wherein the high-refractive film comprises:
a thermosetting resin matrix; and
high refractive particles dispersed in the thermosetting resin matrix,
wherein a refraction index of the high refractive particles is higher than that of the thermosetting resin matrix,
wherein the refraction index of the high refractive particles is in the range of 1.75 to 2.18,
wherein a refractive index of the high-refractive adhesive film is in the range of 1.49 to 1.53, and
wherein a thickness of the high-refractive adhesive film is in the range of 55 µm to 250 µm.

2. The touch panel of claim 1, wherein the high refractive particles are present in the amount of 0.1 to 10 parts by weight based on 100 parts by weight of the thermosetting resin matrix.

3. The touch panel of claim 1, wherein an average diameter of the high refractive particles is in the range of 0.01 µm to 10 µm.

4. The touch panel of claim 1, wherein the high refractive particles include one selected from the group consisting of: zirconium oxide ($ZrO_2$), titanium oxide ($TiO_2$), 3-vinylaniline, barium titanate, fluorene epoxy modified acrylate, niobium oxide, cerium oxide, zinc sulfide and a combination thereof.

5. The touch panel of claim 1, wherein the thermosetting resin matrix is formed by curing an epoxy acrylate photo-curable resin composition or an acrylic photo-curable resin composition that includes one selected from the group consisting of: 2-ethylhexyl acylate (2-EHA), isobornyl acrylate (IBOA), hydroxy ethyl acrylate (HEA), hydroxy butyl acrylate (HBA), hydroxy propyl acrylate (HPA), hexyl methacrylate (HMA) and a combination thereof.

6. The touch panel of claim 1, wherein a functional group exists on a surface of the high-refractive adhesive film,
wherein the functional group is selected from the group consisting of: a hydroxy group, a carbonyl group, an aldehyde group, a halo formyl group, a carbonate ester group, a carboxylate group, a carboxyl group, an ester group, a hydroperoxide group, peroxide group, an ether group, a hemiketal group, an acetal group, an ortho ester group, an ortho carbonate ester group, a carboxylic acid group, an amide group, an amine group, an imine group, an azide group, an azo compound group, a cyanate group, a nitrate group, a nitrile group, a nitro compound group, a nitroso compound group, a thiol group, a sulfonic acid group and a combination thereof.

7. The touch panel of claim 1, wherein a release film is stacked on one surface of the high-refractive adhesive film.

8. The touch panel of claim 7, wherein the release film includes a layer formed from a material selected from the group consisting of polyethylene terephthalate, silicone, and a combination thereof.

9. The touch panel of claim 1, wherein the plastic base layer is a polyethylene terephthalate (PET) film.

10. A touch panel, comprising:
a conductive plastic film including a plastic base layer and a conductive layer having a first and a second surface, such that the second surface of the conductive layer is directly on a surface of the plastic base layer, wherein the conductive layer is indium tin oxide; and
a high-refractive adhesive film, the high-refractive adhesive film is attached on the first surface of the conductive layer, wherein the high-refractive film comprises:
a thermosetting resin matrix; and
high refractive particles dispersed in the thermosetting resin matrix,
wherein a refraction index of the high refractive particles is higher than that of the thermosetting resin matrix,
wherein the refraction index of the high refractive particles is in the range of 1.75 to 2.18,
wherein a refractive index of the high-refractive adhesive film is in the range of 1.49 to 1.56, and
wherein a thickness of the high-refractive adhesive film is in the range of greater than 100 µm to 250 µm.

* * * * *